Feb. 28, 1961     J. G. CHEVALIER     2,973,462
MODIFIED SINGLE-COMPENSATOR THREE-PHASE RELAYS
Filed Sept. 20, 1957     2 Sheets-Sheet 2

3∅ FAULT NEAR B.P.

3∅ FAULT NEAR BUS tt# 2,973,462

MODIFIED SINGLE-COMPENSATOR THREE-PHASE RELAYS

Jean G. Chevalier, Parsippany, N.J., assignor to Westinghouse Electric Corporation, East Pittsburgh, Pa., a corporation of Pennsylvania Filed Sept. 20, 1957, Ser. No. 685,277

16 Claims. (Cl. 317—47)

My invention relates to a protective relaying system which uses polyphase responsive elements energized from polyphase compensated bus-voltages at the relaying station.

My invention is an improvement in a compensation relaying assembly which is described and claimed in an application of W. K. Sonnemann, Serial No. 685,155, filed September 20, 1957.

This assembly makes use of a new type of distance relay for the fault-protection of three-phase transmission-lines or power-lines by the use of a compensator or compensators, connected in series with the bus-voltages at the relaying station, and energized from one or more of the line-currents, for deriving a set of compensated three-phase relaying voltages which reproduce some aspect of the line-voltages at some predetermined fault-location in the power-line or system, in combination with polyphase responsive relaying-means, energized from said compensated polyphase relaying voltages, for developing an operating component which is responsive to the magnitude of the negative-sequence component of said compensated three-phase relaying voltages, and a restraining component which is similarly responsive to the magnitude of the positive-sequence component of said compensated relaying voltages; or the relaying means may operate on the principle of a polyphase induction motor, energized from said compensated three-phase relaying voltage; or the relaying means may operate on the principle of a sine relay, energized from two of the phases of said compensated three-phase relaying voltages, for operating in response to the product of the magnitudes of said two phases, multiplied by the sine of the phase-angle between them.

My invention has many advantages, including a great reduction in the number of relaying elements which are necessary for the protection of the power-line in each of the three distance-zones, zone 1, zone 2 and zone 3, which are commonly used in distance-relaying. Since the torque-producing element responds to phase-sequence components, a separate element is not needed for each phase.

The assembly of which my present invention forms a part has an additional advantage resulting from the fact that the polyphase-responsive compensated-voltage distance-responsive relaying-elements are inherently directional, thereby avoiding the need for a separate directional element or means, and eliminating the contact-coordination problem which is entailed by the use of separate distance and directional elements. This inherent directional response is obtained both at the balance-points of the distance-responsive elements and at the relaying bus, or more exactly, at the location of the line-current transformers.

In all types of compensated-voltage distance-relays using the general principles of my invention, the relay-response is zero if the fault is located exactly at the balance-point of the relay; if the fault is nearer than the balance-point, the negative-sequence component of the impressed relay-voltage is larger than the positive-sequence component, and the relay produces response in the operating direction; but if the fault is beyond the balance-point, the positive-sequence component is the larger, and the relay-response is in the restraining direction. But since the polyphase-responsive relaying-element is very sensitive to small positive and negative-sequence components, the balance point can be set very accurately, more accurately than has heretofore been achieved.

More particularly, my present invention relates to an improvement in a polyphase-responsive single-compensator three-phase-fault-responsive relaying-unit which is described and claimed in an application of S. L. Goldsborough, Serial No. 685,168, filed September 20, 1957. In this unit, a single line-drop compensator is used, which subtracts 1.5 times the line-drop to a predetermined fault-location in the protected power-line, from one phase of the bus-voltage at the relaying station, so as to make the unit have a balance point, or zero response, both when a three-phase fault occurs at said predetermined fault-location, and when a three-phase fault occurs at the bus. At each balance point, the polyphase-responsive relaying-element of the unit reverses its response, so that the unit responds only to faults which are located between said predetermined fault-location and the bus.

Such a three-phase fault-responsive unit, for responding to three-phase faults, is used in combination with a three-compensator polyphase-responsive phase-fault unit such as is described and claimed in the previously mentioned Sonnemann application, so that the two units, between them, will respond to all kinds of multiple-conductor faults, or faults involving more than one of the line-conductors of the protected power-line.

However, the three-compensator phase-fault relaying-unit has a defect, which is experienced only on a small number of extreme lines, which have an abnormally low zero-sequence source-impedance back of the relaying bus. In such cases, a close-to-the-bus double-line-to-ground fault will draw very high zero-sequence currents and very low negative-sequence currents, and since the polyphase-responsive element requires a preponderance of negative-sequence over positive-sequence components to produce an operating response, it will fail to respond, in such extreme cases.

My present invention overcomes this difficulty by making Goldsborough's single-compensator three-phase unit respond to these close-in double-line-to-ground faults, in lines having an unusually low zero-sequence source-impedance back of the relaying bus. I do this by subtracting $3I_0$, or three times the zero-sequence line-current component $I_0$, from the line-current which energizes the single compensator of the three-phase-fault-responsive unit. This has no effect upon the unit's response to three-phase faults, which have no zero-sequence component, but it makes a close-in double-ground fault, which has a high zero-sequence component and a very low negative sequence component, look to my modified three-phase relaying-unit like a three-phase fault, so that the three-phase unit will respond; and between them, the three-phase unit and the phase-fault unit will give adequate protection against all multiple-conductor faults.

My invention also cures a defect in the universal applicability of Goldsborough's single-compensator three-phase relay, which would overreach on double-line-to ground faults involving the compensator-phase, if used on lines in which the zero-sequence impedance is very exceptionally low, approaching zero. By removing $3I_0$ from the compensator energizing-current, I remove the possibility of such overreaching, and I thus make the single-compensator three-phase fault-responsive element universally applicable on all power-lines.

Still more specifically, my invention relates to compensated-voltage relaying units and systems of the general types just described, in which the polyphase-responsive element is a multipolar torque-producing element using a cylindrical rotor, the multipolar element preferably having four poles which are so energized as to produce two diametrically flowing fluxes, each flux being responsive to one of the two compensated voltages which are applied to said torque-producing element. Such a torque-producing element is known to combine the advantages of a high operating-torque, and a low inertia, which together spell a high rate of response and great sensitivity of response, in combination with the elimination of the objectionable double-frequency pulsating torques. Since such a two-flux torque-producing element is not a balanced three-phase element, its energizing connections should be such as to provide no flow of zero-sequence current in the torque-producing element, so as to eliminate hybrid torques which are responsive to the products of the zero-sequence current multiplied by each of the two rotational-sequence currents, namely the positive-sequence current and the negative-sequence current, respectively, which would shift the balance-point of the element.

With the foregoing and other objects in view, my invention consists in the apparatus, circuits, combinations and methods of operation, hereinafter described and claimed and illustrated in the accompanying drawing, wherein:

Figure 1:
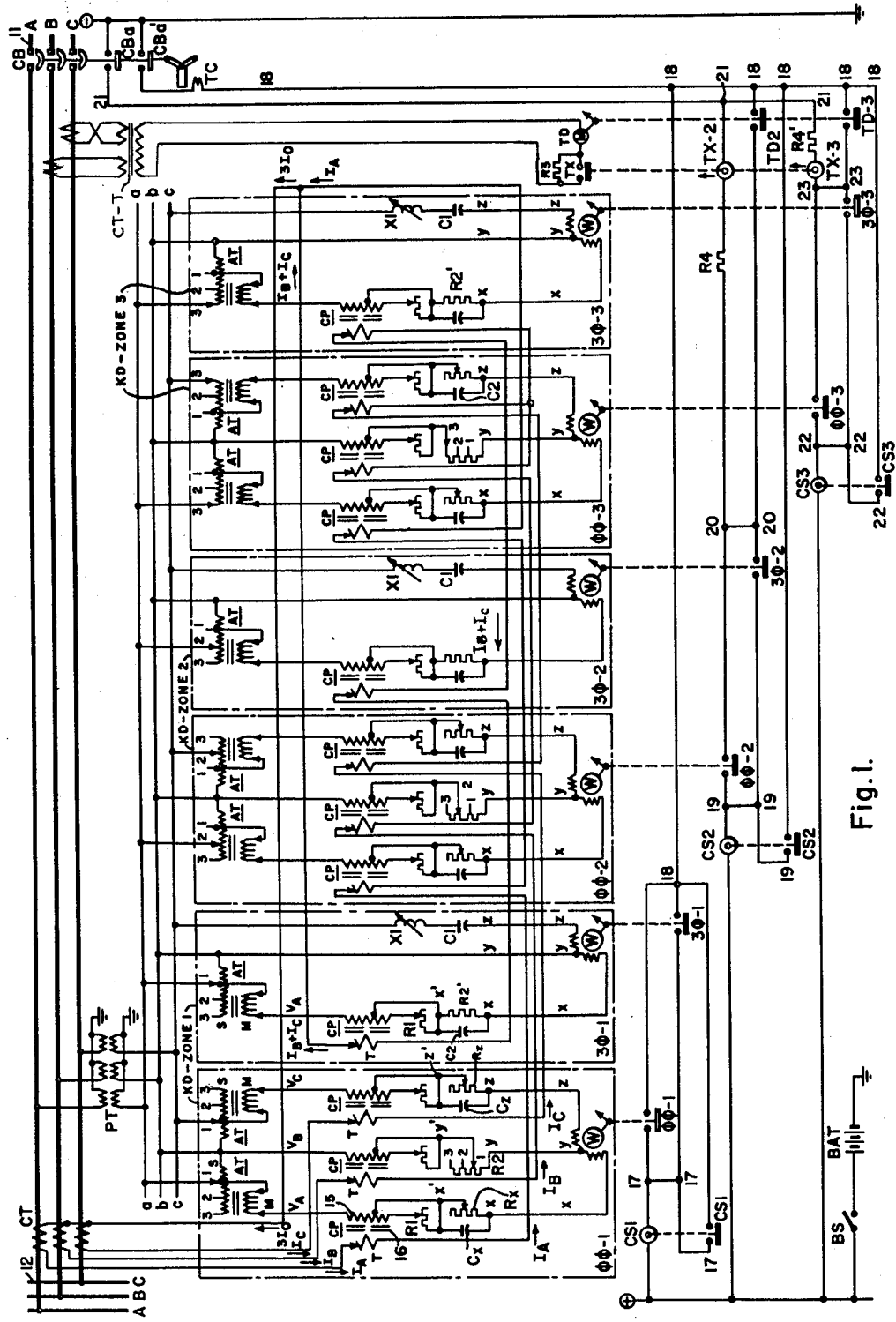
Fig. 1 is a diagrammatic view of the best form of embodiment of circuits and apparatus, which I at present prefer for embodying my invention in a non-carrier relaying equipment for protecting one terminal of a three-phase power-line against faults involving either two or three phases of the line.

In Fig. 1, I show my compensator relaying system, applied for the protection of a three-phase line-section 11, which is connected to a three-phase bus 12, at the relaying station, through a circuit breaker CB. A set of line-current transformers CT derive the line-curents $I_A$, $I_B$, $I_C$ and the star-point current $3I_0$ for relaying purposes, where $I_0$ is the zero-sequence component of the line-currents. A set of potential transformers PT is used for deriving the line or bus-voltages $a$, $b$ and $c$ for relaying purposes.

In Fig. 1, I show six relaying-units which I call Type KD units, two for each of the three zones of protection, namely, a phase fault unit for responding to all kinds of double-line faults, and a three-phase unit 3φ for responding to three-phase faults, for each zone, the zones being indicated by appended numbers, such as the designation φφ–1 for the first-zone phase-fault unit or element. I also show a time-delay element or timer TD, an auxiliary timer-starting relay TX, and three contactor-switches CS1, CS2 and CS3. The contacts of the circuit breaker CB and the various relay-elements are shown in their deenergized positions, and are regarded as being raised by the operation of the respective elements. The physical connections between the various relay-contacts and the various operating-coils of the respective relays are shown as dotted vertical stems, which are intended as a convention for indicating the mechanical connection between the parts of each relay-element. As a further convention, the same legends are applied, both to the force-producing or operating-member, and to the contact-members of each relay-element, to denote their relationship. The timer TD has two contacts, which are distinguished as TD2 and TD3, which close after different time-delays suitable for the second-zone and third-zone relays, respectively.

Each of the six illustrated relaying-units operates on compensated voltages. Since the amount of the mutual compensator-impedance, which is required in the alternating-current relaying circuits, is directly proportional to the value of the derived bus-voltage which is used in said relaying circuits, I have shown, in Fig. 1, a convenient means for aiding in adjusting the effective impedance-value of each compensator, by adjusting the value of the derived bus-voltage which is applied to the relaying circuits. To this end, I show a plurality of autotransformers AT, each having three adjustable primary-connection taps numbered 1, 2 and 3 on each main autotransformer-winding S. The secondary or output circuit of each autotransformer is permanently connected to the tap S1, and this secondary circuit serially includes some fine-adjustment taps on a tertiary winding M of the autotransformer, which can add or subtract small fractional increments to the secondary voltage, according to the polarity of the connections to the M-taps. The output-circuit of the tertiary autotransformer-winding M produces the effective bus-voltages which is used in that phase of the relaying circuit.

In the preferred form of embodiment of my invention, which is shown in Fig. 1, each of the compensators CP is provided with a tapped primary winding T, having a small number of turns, and a secondary winding 15, having a large number of turns, these two windings being magnetically interlinked through an air-gapped core 16, so that the compensator-voltage which is generated in the secondary winding 15 will be substantially 90°, or less, out of phase with the current which traverses the primary winding T, depending upon the amount of effective resistance R1. The taps of the primary winding T of each compensator CP are numbered in various ohm-values which are so chosen that a correct replica of the positive-sequence line-impedance $Z_{BP}$ of the protected line 11, to a distance as far as the desired balance-point of the relay, will be obtained when $$Z_{BP} = \frac{TS}{1 \pm M}$$

where T, S and M are the numbers or fractional numbers which are marked on the chosen taps or the compensator-primary T, the main autotransformer-winding S, and the tertiary autotransformer-winding M, respectively. In this manner, I provide a very convenient means for setting the mutual impedance of the compensator to have an ohmic value which matches the line-impedance of any given line 11 at any balance-point distance from the relaying station, at which it is desired for the relay to have a zero response or a balance-point. While this particular type of balance-point compensator-adjustment is preferred, I am, of course, not limited altogether thereto.

It will be subsequently explained that, for the best results, the impedance-angle of the compensator-impedance should match the impedance-angle of the particular transmission-line 11 which is being protected. In accordance with an invention which is described and claimed in an application of Howard J. Calhoun, Serial No. 685,-167, filed September 20, 1957, Fig. 1 shows a preferred way to adjust the phase-angle relation between the primary current of each compensator and its secondary voltage, without using large values of resistance, and without causing much change in the mutual impedance or the output-voltage of the compensator as a result of changes in the angle-adjustments. To this end, a small percentage of the total number of turns of the secondary winding 15 of each compensator CP are shorted through a variable resistance R1, which can be varied from R1=0, to provide a minimum impedance-angle, to R1=600 ohms, to provide a maximum impedance-angle of approximately 85° (for example); or the resistance R1 may be infinity, or an open circuit, to provide an impedance-angle of substantially 90°. The combination of a small value of resistance R1 and few shorting turns on the secondary winding 15 not only reduces the compensator-burden, but it also results in a minimum change in the mutual impedance when the value of the resistance R1 is changed for the purpose of adjusting the compensator for lines of different impedance-angles. This provides the best means which has heretofore been devised for accomplishing this purpose.

Referring, now, to the phase-fault units $\phi\phi$–1, $\phi\phi$–2 and $\phi\phi$3 of the three zones, 1, 2 and 3, of the non-carrier Type KD relaying system shown in Fig. 1, it is a characteristic feature of these units as described and claimed in the above-mentioned Sonnemann application, that each unit uses three identical compensators CP, connected in series with the respective open-delta voltage terminals $V_A$, $V_B$ and $V_C$ which are supplied by two autotransformers AT. One of these two autotransformers AT has its primary connection across the delta phase $ba$ of the potential-transformer bus $abc$, while the other autotransformer has its primary connection across the delta phase $bc$. The three phase-fault relay-units $\phi\phi$–1, $\phi\phi$–2, and $\phi\phi$–3, are designed to respond to line-to-line faults and to double line-to-ground faults. Said units are all alike, except for their different distance-settings, or the different impedance-settings of their compensators CP, as indicated by the choice of the S-taps 1, 2 and 3, respectively, for the first, second and third zones, as shown in Fig. 1.

The output-circuits of the two autotransformers AT of each phase-fault relay-unit, such as the unit $\phi\phi$–1, thus provide an adjustable three-phase derived bus-voltage $V_A$, $V_B$, $V_C$. The primary windings T of the three compensators CP of each of these phase-fault units, such as $\phi\phi$–1, are energized from the respective derived line-current $I_A$, $I_B$ and $I_C$ which are supplied by the line-current transformers CT. The three compensators CP subtract their respective compensator-voltages from the corresponding phases of the derived bus-voltages $V_A$, $V_B$, and $V_C$ producing a three-phase compensated voltage at the points $x'$, $y'$, and $z'$ as shown for the relay-unit $\phi\phi$–1 in Fig. 1.

As described and claimed in Mr. Sonnemann's aforesaid application, the compensated voltages $x'$, $y'$, and $z'$ of each phase-fault relaying-unit, such as $\phi\phi$–1 in Fig. 1, are used to energize a suitable type of torque-producing relaying-element which produces no torque at all (that is, it has a balance-point), when the positive and negative-sequence components of the impressed three-phase voltages $x'$, $y'$, $z'$ are equal to each other (which is the case when the voltage-triangle has collapsed to a single line or phase), or when said voltage-triangle has completely collapsed to a point. Said torque-producing relay-element has an actuating torque when the negative-sequence voltage-component predominates, while it has a restraining or non-actuating torque when the positive-sequence component predominates. Any suitable torque-producing element which answers this basic description will suffice, whether it is a balanced element, like a three-phase induction motor, in which the internal impedances and angular spacings of the element are alike in each phase, or whether said torque-producing element is an unbalanced element, such as a two-circuit element, the two circuits of which are energized from different voltages derived from the impressed three-phase voltages $x'$, $y'$, $z'$.

There are advantages in using a two-circuit torque-producing element, as diagrammatically indicated by the wattmeter type of single-phase relay-element W in each of the six relaying units $\phi\phi$–1, $3\phi$–1, $\phi\phi$–2, $3\phi$–2, $\phi\phi$–3 and $3\phi$–3 as diagrammatically indicated in Fig. 1. There are various ways in which the two circuits for each of these torque-producing elements may be energized, from any two differing voltages which may be derived from different phases of the three-phase compensated voltages, such as $x'$, $y'$, $z'$ of Fig. 1.

In the particular circuit-connections which are shown for the $\phi\phi$–1 relay-unit in Fig. 1, the two-circuit torque-producing element W has one winding-circuit $xy$ energized across the delta-phase $x'y'$ of the compensated three-phase voltages $x'y'z'$, while its other winding-circuit $zy$ is energized across the delta-voltage phase $z'y'$. If the circuit-connections to and within the two-circuit torque-producing element W are such that no zero-sequence currents can flow in this element, as in the connections shown for the $\phi\phi$–1 unit in Fig. 1, then the torque-producing element will have no hybrid, balance-point-shifting responses to the product of the zero and positive-sequence relay-currents or to the product of the zero and negative-sequence relay-currents.

As described and claimed in the aforesaid Calhoun application, it is desirable, for best operation, in the phase-fault units, such as $\phi\phi$–1 of Fig. 1, to balance both the steady-state and the transient impedance-angles in the three circuits leading up to the common connection $y$ of the wattmeter-element terminals $xyz$. This refers to the impedances which are connected between the bus-voltage terminal $a$ and the relay-terminal $y$, the impedances which are connected between the bus-voltage terminal $b$ and the relay-terminal $y$, and the impedances which are connected between the bus-voltage terminal $c$ and the relay-terminal $y$.

As described and claimed in the aforesaid Calhoun application, the impedance-angles in these three circuits are kept substantially equal, notwithstanding the angle-changes which are introduced by changing the primary taps S1, S2 and S3 on the autotransformers AT, by introducing a resistance R2 in circuit between the points $y'$ and $y$, and providing this resistance R2 with three taps, also numbered 1, 2 and 3, which are changed simultaneously with the S-taps of the autotransformers. Dissimilar transient effects, due to sudden bus-voltage changes in the three circuits $ay$, $by$ and $cy$, are compensated for by serially including capacitors $C_x$ and $C_z$ between the points $x'$ and $x$ and between the points $z'$ and $z$, respectively, to compensate for the inductive reactances in these circuits. The effective values of these angle-adjustment capacitors $C_x$ and $C_z$ are adjustable by means of parallel-connected adjustable resistances $R_x$ and $R_z$, respectively.

These transient-suppressing circuit-portions ($C_xR_x$), R2, and ($C_zR_z$) balance the phase-angles of the impedances of the three circuits $ay$, $by$ and $cy$, with open primaries on the three compensators CP. Thus, when a close-in phase-to-phase fault occurs, behind the current transformers CT, one of the delta bus-voltages $V_{AB}$, $V_{BC}$, or $V_{CA}$ is collapsed to zero. If we assume the extreme system-condition of no back-feed current over the line which is being protected, the compensators do nothing to alter this collapsed voltage under this condition, there should be no spurious torque in the relay to cause it to respond incorrectly. The transient-suppressing elements prevent such spurious response as might otherwise be occasioned by the sudden change in the bus-voltages in the extreme case in which there may be no current in the primaries of the compensators.

Fig. 1 also shows three three-phase-fault-responsive relays $3\phi$–1, $3\phi$–2, and $3\phi$–3, one for each of the three zones. These particular relays embody the basic concept of the previously mentioned invention of S. L. Goldsborough.

Fig. 1 actually shows an improved form of the three three-phase relays $3\phi$–1, $3\phi$–2, $3\phi$–3, one for each of the three zones. These relays embody the basic ideas of a three-phase fault-responsive element in accordance with my present invention. These three relays are all alike, except for their distance-settings which are changed in much the same manner as has been described for the phase-fault relays $\phi\phi-1$, $\phi\phi-2$, $\phi\phi-3$, so that a description of one, say the three-phase element $3\phi-1$, will suffice for all.

A principal characteristic feature of this three-phase fault-responsive relay $3\phi-1$, as distinguished from the phase-to-phase fault-responsive relay $\phi\phi-1$, is that the three-phase relay $3\phi-1$ uses only a single compensator CP, which has 1.5 times the effective mutual impedance of each of the three compensators CP which are used in the phase-fault relay $\phi\phi-1$. The phase in which this single compensator CP is connected, in the relay-unit $3\phi-1$ of Fig. 1, is designated as phase A. This three-phase unit $3\phi-1$ uses a single autotransformer AT, which is similar to the autotransformers which have been described for the phase-fault relay $\phi\phi-1$. This single autotransformer AT is connected between the phases $b$ and $a$ of the relaying bus $abc$, so as to provide the adjustable voltage $V_A$, which is phase A of the three-phase bus-voltages which are used for energizing the torque-producing element W of this three-phase unit $3\phi-1$, the other two bus-voltage phases being the phases $b$ and $c$, unchanged.

In the three-phase unit $3\phi-1$, the single compensator CP has its secondary winding 15, with some of its turns shorted through a mutual-impedance angle-controlling resistor R1, connected in series with the bus-voltage terminal $V_A$, to produce the compensated voltage $x'$, as described for the phase-fault relay $\phi\phi-1$, remembering that the compensator CP in the three-phase relay $3\phi-1$ has an impedance-setting which is 1.5 times as high as in the phase-fault relay $\phi\phi-1$.

The three-phase relay $3\phi-1$ which is shown in Fig. 1 embodies my present invention in which the compensator-primary T is traversed by the current $-(I_B+I_C)$, which is equal to $(I_A-3I_0)$, where $I_0$ is the zero-sequence component of the line-current, as derived by the current-transformer CT.

The cylinder-unit W, which is used in the three-phase relay-element $3\phi-1$ in Fig. 1, is basically a two-phase induction motor which produces torque in a direction which is determined by the phase-angle between the two voltages, and in a magnitude which is responsive to the product of the two voltages which are impressed upon the torque-producing element. When a three-phase fault occurs close to the bus 12 at the relaying terminal of the protected line 11, all of the delta voltages of the bus will collapse to zero. And since the three-phase element $3\phi-1$ uses only one compensator CP, there will be a voltage $x'$ in only one phase of the three-phase voltages which are supplied to the torque-producing cylinder-unit W, this phase being the phase which contains the compensator CP. This provides energization for the phase-winding $xy$ of the torque-element W. However, the energization for the other phase-winding $zy$ of the torque-element collapses to zero, in response to a three-phase line-fault near the bus, which means that the torque-element, if it responded at all under such conditions, would have only a momentary transient response, as a result of its memory-action as the uncompensated $zy$ voltage is collapsing to zero.

In order that the three-phase fault-responsive unit $3\phi-1$ may react, with accuracy or intelligence, to a three-phase line-fault close to the relaying station 12, it is desirable not only to sustain a sufficient magnitude of the uncompensated bus-voltage $zy$ which is applied to the torque-producing element, so that there can be a sufficient torque to operate the relay, but also to sustain or maintain the proper phase-angle between the two relay-voltages $xy$ and $zy$, long enough for the relay to react at all, and to know in which direction to react, because the relay-torque is determined by the product of the magnitudes of the impressed voltages, multiplied by the sine of the phase-angle between these two voltages.

As described and claimed in the previously mentioned Calhoun application, the uncompensated $zy$ voltage on the torque-element W of the three-phase unit $3\phi-1$ is sustained, for a sufficiently long time, by a memory-circuit comprising a serially connected capacitor C1 and an adjustable choke-coil X1, connected in series between the bus-terminal $c$ and the terminal $z$ of the torque-producing element W. It is necessary that the duration or decrement of the memory-action of this memory-circuit C1, X1 shall be sufficiently long to enable the torque-element to produce any torque at all by the end of the time within which said torque-element must accurately respond, but it is also necessary that the tuning of the circuit which includes the memory-circuit C1, X1 shall be substantially equal to the line-frequency of the protected line 11, so that the oscillating current in this tuned circuit will not get much out of phase with the corresponding line-frequency current, during the number of line-frequency cycles during which it is necessary for the torque-element to respond, with a positive torque for faults in front of the relaying station, or with a negative torque for faults behind the relaying station.

However, the introduction of the capacitor C1 of the memory-circuit, in the relaying unit $3\phi-1$ of Fig. 1, necessarily introduces a transient disturbance, which is suppressed or compensated for, in accordance with the Calhoun invention, by connecting a second capacitor C2 between the points $x'$ and $x$, in the compensated-voltage phase $x$ of said torque-element $3\phi-1$, this second capacitor C2 being shunted by a resistor R2' which not only enhances the effect of the capacitor C2, but also enables said capacitor to suppress transients with as littly memory-action as possible.

The relaying equipment which is shown in Fig. 1 requires a timer, such as TD, which is available whenever there is a line-fault involving at least two of the line-phases. While I am not limited as to exact details, I prefer to use a single-phase timer TD, which receives an energizing current whenever a fault-current is flowing, involving at least two of the line-phases. By way of example, I have shown the timer TD as being a motor-element M which is energized from a saturable many-turn current-transformer CT–T, which is in turn energized, for example, by the difference of the line-currents $I_B$ and $I_C$.

The timer-motor TD is connected in series with the normally open make-contact TX of an auxiliary timer-relay TX. This make-contact TX is bypassed by a resistance R3, which is sufficiently small to avoid substantially open-circuiting the current-transformer CT–T when said contact TX is open, but the resistance R3 is sufficiently large to prevent the timer TD from operating when said resistance is connected in series with it.

The six fault-responsive elements of Fig. 1 have correspondingly numbered make-contacts $\phi\phi-1$, $3\phi-1$, $\phi\phi-2$, $3\phi-2$, $\phi\phi-3$ and $3\phi-3$, which are used to control certain relaying-circuits which are shown as being energized from a positive direct-current bus $(+)$.

The first circuit which is connected to the positive bus $(+)$ in Fig. 1 is a first-zone tripping-circuit which includes the operating-coil of a contactor-switch CS1, then a circuit 17, then the make-contact $\phi\phi-1$ of the first zone phase-fault unit $\phi\phi-1$, then a tripping-circuit 18, which extends up through the trip-coil TC of the circuit breaker CB, and finally through an auxiliary circuit-breaker make-contact CBa' to a negative bus $(-)$, the circuit-breaker make-contact CBa' being closed when the circuit breaker CB is closed, the circuits being illustrated, however, with all switches and relays open or deenergized. Two branch-circuits are also provided between the points 17 and 18 of the first-zone protective-relaying equipment, these two branch-circuits including, respectively, the make-contact 3φ–1 of the first-zone three-phase unit 3φ–1, and the make-contact CS1 of the contactor-switch CS1.

A second-zone relaying-circuit is next shown in Fig. 1, extending from the positive bus (+) through the energizing-coil CS2 of a second contactor-switch CS2, then to a circuit 19, then through the make-contact φφ–2 of the second-zone phase-fault unit φφ–2 to a circuit 20, then through a resistor R4 and through an operating coil TX–2 of the auxiliary timer-relay TX to a circuit 21, which extends up through an auxiliary make-contact CBa of the circuit breaker CB, and thence to the negative bus (—). The two circuits 19 and 20 are joined also by a branch-circuit which includes the make-contact 3φ–2 of the second-zone three-phase unit 3φ–2. Consequently, the circuit 20 is energized as a result of the response of either one of the two second-zone units φφ–2 or 3φ–2. This circuit 20 thus energizes the auxiliary timer-relay TX, which initiates the movement of the timer TD, whenever there is a line-fault which activates either one of the second-zone relays.

The aforesaid circuit 20 is also used to trip the circuit breaker CB at the end of a predetermined time which is determined by the closure of the second-zone contact TD2 of the timer TD, which thereupon energizes the trip-circuit 18 from the circuit 20. The TX coil, either because of its built-in resistance, or because of an externally connected resistance R4, does not draw sufficient current from the circuit 20 to pick up the second contactor-switch CS2, but the trip-coil TC draws a very heavy current as soon as the second-zone timer-contact TD2 closes, thus causing the second contactor-switch CS2 to pick up and close its make-contact CS2, which completes a circuit-connection between the circuits 19 and 18, thus sealing-in the second-zone tripping-response.

A third relaying-circuit is connected, in Fig. 1, from the positive bus (+) through the operating coil of a third contactor-switch CS3, then to a circuit 22, then to two branch-circuits, one extending from the circuit 22 through the make-contact φφ–3 of the third-zone phase-fault unit φφ–3 to a circuit 23, the second branch-circuit extending from the circuit 22 through a make-contact 3φ–3 of the third-zone three-phase unit 3φ–2 to said circuit 23. From the circuit 23, a first branch-circuit continues through a second operating-coil TX–3 of the auxiliary timer-relay TX, and thence to the circuit 21, so that the auxiliary timer-relay TX will initiate the movement of the timer TD whenever there is a line-fault which activates either one of the third-zone relays.

A second branch-circuit of the circuit 23 is provided, to make connection to a third-zone timer-contact TD3 which closes after a longer time-interval than is required for the closure of the second-zone contact TD2 of the timer TD. The third-zone timer-contact TD3 energizes the trip-circuit 18 from the circuit 23, and when this happens, the third contactor-switch CS3 is energized, picking up its make-contact CS3, and closing a circuit-connection between the conductors 22 and 18.

At the bottom of Fig. 1, the positive bus (+) is shown as being energized, through a battery-switch BS, from the positive terminal of a battery BAT, the negative terminal of which is grounded, to connect with the grounded negative bus (—).

My present invention relates not only to the novel design of the single-compensator three-phase-fault-responsive relaying-units 3φ–1, 3φ–2 and 3φ–3, and to all uses and adaptations thereof, but it also relates to the illustrated combination of these units with the other relaying-units using the principle of compensated-voltage polyphase-responsive torque-producing elements; or, in general, it relates to combinations of my particular units with other compensated-voltage relaying-units which are properly responsive to the multiple-conductor faults which are not adequately responded to by my units, or to combinations of phase-fault and three-phase compensated-voltage polyphase-responsive relaying-units in which one units supplies a lack in the responsiveness of the other, so that the combination, as a whole, affords adequate protection against all kinds of multiple-conductor faults on the protected power-line.

In all of the relaying-units of Fig. 1, in which the torque-producing element is shown as a two-phase wattmeter-type element W, which is energized from two different voltages of a compensated three-phase voltage-supply xyz, the essential thing about the torque-producing element W is that it shall be a polyphase-responsive element which develops an operating force when its impressed voltages have a negative sequence of phases, or which develops an operating force which is responsive to the magnitude of the negative-sequence component of the compensated three-phase relaying voltages, and a restraining force which is similarly responsive to the magnitude of the positive-sequence component of said compensated relaying voltages; or that the torque-producing element W shall produce an operating torque when the negative-sequence component is larger than the positive-sequence component of the compensated relaying voltages, while producing a negative or non-operating torque when the positive-sequence component is the larger; or that the torque-producing element W shall be any torque-producing element operating on the principle of a polyphase (two-phase or three-phase, or the like) induction motor (having balanced or unbalanced polyphase windings), energized from said compensated three-phase relaying voltages xyz, and having a starting-torque corresponding to $(\bar{E}_1^2 - \bar{E}_2^2)$ where $\bar{E}_1$ and $\bar{E}_2$ are the respective scalar values of the positive and negative-sequence voltages, such a motor being used as a relay to respond to the negative starting-torque, in the direction of rotation of the negative-sequence voltage-vector $E_2$; or that the torque-producing element W, if it is energized from a system of delta-connected voltages, shall be responsive to the area of the delta-triangle and to the order of phase-sequence or succession of the phases in the delta-triangle; or that the torque-producing element W, if it is a two-phase element, shall develop an operating force which is responsive to the product of the magnitudes of the two relay-voltages, multiplied by the sine of the phase-angle between them. Any relaying device, electromechanical, static, or otherwise, which will serve to close an electrical circuit sufficiently to trip a circuit breaker whenever the negative-sequence voltage is greater than the positive-sequence voltage, will do the job within the broad concept of the invention.

When the polyphase torque-producing element W is balanced, in all phases of a symmetrical polyphase set of phases, it will not respond to the zero-sequence voltage-component, even through such a voltage-component is present in the impressed voltages. When, however, the circuits of the polyphase torque-producing element W are not balanced, it is quite desirable to keep zero-sequence currents out of said element, either by keeping the zero-sequence voltage-component out of the polyphase voltages which are impressed upon the torque-producing element, or by making the connections in such a way that there is no return-path for any flow of zero-sequence current in any phase-winding of the element; thus preventing the possibility of a shifting of the balance-point of the element as a result of hybrid torques involving the product of the zero and positive-sequence components, or the product of the zero and negative-sequence components.

I believe that my invention has a very important utility in its applicability to a cylinder-type multipolar relay-element W, preferably one which has four poles, with two diametrically flowing fluxes, in accordance with the broad principles described and claimed in the Sonnemann Patent 2,380,197, granted July 10, 1945, using a light-weight conducting cylinder as the torque-producing rotor-member. Such an element has the advantage of compactness, an extremely low rotor-inertia and hence a high speed of response, and freedom from the pulsating double-frequency torques which interfere with the sensitivity of certain other kinds of wattmeter-type relays. It is to be noted, however, that the four-pole cylinder-type relay-element has only two energizing-circuits, whereas, to serve in my compensator relaying-system, it must be energized from a three-phase compensated bus-voltage, in such a manner as to respond only when the negative-sequence voltage is larger in magnitude than the positive-sequence voltage. This requires special circuit-connections for satisfactorily energizing a two-winding torque-producing element W from a source of three-phase voltages.

When these connections are made, however, using a line-current-energized compensator or compensators for compensating the polyphase bus-voltages, with the proper compensator-impedance to produce a zero relay-torque at a desired balance-point, such a combination has the very distinct advantages of completely avoiding the necessity for using directional relays in responding to faults involving more than one line-conductor. The positive and negative-sequence components of the compensated polyphase relay-voltages are equal, for faults at the balance-point, while the positive-sequence component prevails for faults which are even very slightly beyond the balance-point, and the negative-sequence component prevails for faults which are even very slightly nearer than the balance-point. Thus the balance-point of such a combination may be set and maintained, very accurately, more so than has heretobefore been possible. Such a combination also has an advantage in responding to faults near the relaying-station bus, because the line-currents, which energize the compensators, are in one direction when the fault is in front of the line-current transformers, and in the other direction when the fault is behind the line-current transformers.

Figure 2:
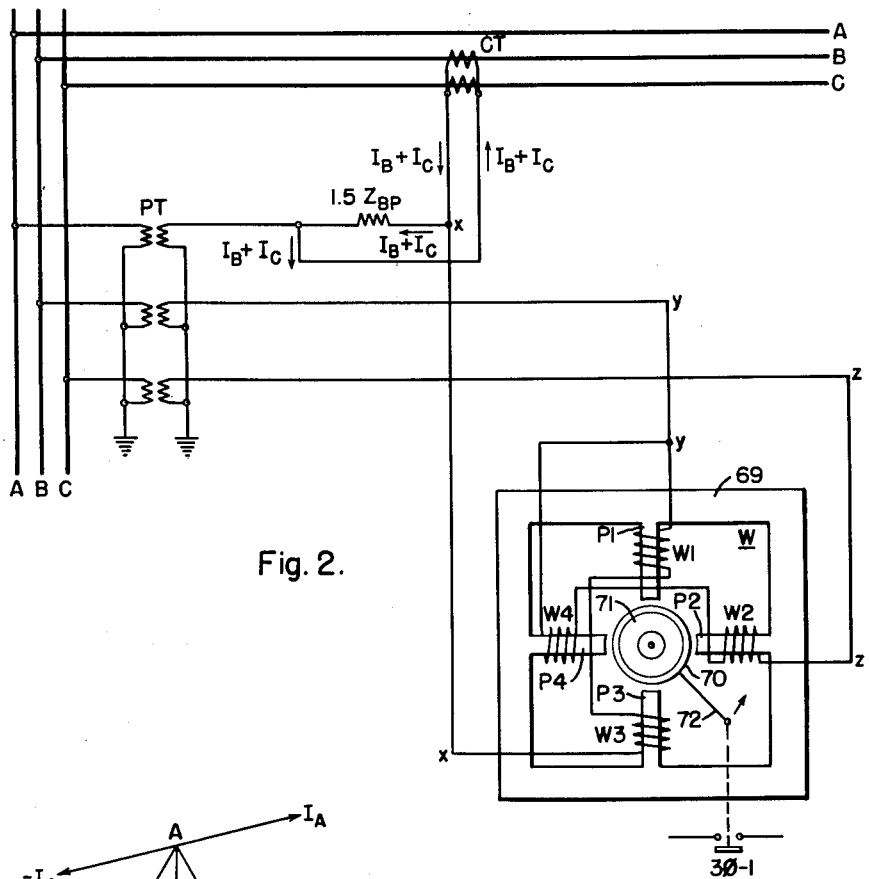
Fig. 2 is a simplified diagram of the essential basic principles of my improved single-compensator three-phase relay, as exemplified by the first-zone three-phase relay 3φ–1, but showing the use of a four-pole cylinder-type torque-producing element.

Fig. 2 is a very much simplified diagram illustrating the basic essential principles involved in the operation of my new single-compensator three-phase fault-responsive relay which is exemplified by the first-zone three-phase element 3φ–1 in Fig. 1, but using a four-pole cylinder-type torque-element W.

In Fig. 2, the potential transformers PT reproduce the line or bus-voltages $V_A$, $V_B$ and $V_C$. The single compensator CP which is shown for this element 3φ–1 in Fig. 1, is represented in Fig. 2 as an impedance which has a value of 1.5 times the line-impedance $B_{BP}$ of the protected line 11, out as far as the desired balance-point of the relay, this impedance $1.5Z_{BP}$ being connected between the bus-voltage terminal $V_A$ and the compensated-voltage terminal $x$. In Fig. 2, this impedance $1.5Z_{BP}$ is traversed by $-(I_B+I_C)$, which is equal to $(I_A-3I_0)$, where $I_A$, $I_B$ and $I_C$ are the line-currents reproduced by the current-transformers CT in Fig. 1, and $I_0$ is their zero-sequence component. This means that the current $(I_B+I_C)$ flows backwardly through the impedance $1.5Z_{BP}$ as shown in Fig. 2, producing the same impedance-voltage-drop as the compensator CP for this first-zone three-phase element 3φ–1 in Fig. 1.

In Fig. 2 the torque-producing element W of my improved single-compensator three-phase element 3φ–1 is shown, in its preferred form of embodiment, as a four-pole cylinder-type element, comprising a stationary magnetizable frame 69 having four salient poles P1, P2, P3 and P4, carrying windings W1 to W4, respectively. Inside of the four poles there is a light-weight, rotatably mounted cylinder 70 of aluminum or other conducting material in which eddy currents are induced for producing a rotational torque tending to rotate the cylinder in one direction or the other, according to the predominance of the positive or negative phase-sequence component of the currents in the windings W1 to W4. Inside of the cylinder 70, there is usually mounted a stationary cylindrical magnetizable member 71 for providing a return-path for the flux from one pole to another, thus making the flux as large as possible, and consequently increasing the available torque. Since the relay-element W operates on alternating current, its stationary magnetizable members 69 and 71 are preferably of laminated materials, while the cylindrical rotor-element 70 is preferably made of a light-weight non-magnetizable conducting material. An operating-arm 72 is attached to the rotor-cylinder 70, for actuating the contact-member 3φ–1 when the element W responds.

Figure 3:
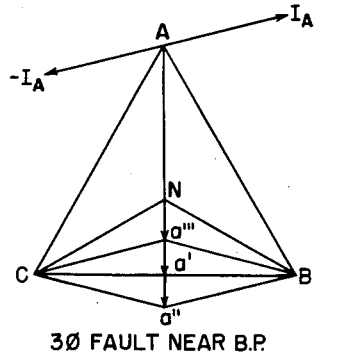
Figs. 3 and 4 are vector diagrams which will be referred to in the explanation of Fig. 2.

Fig. 3 is a vector diagram illustrative of the response of the relay of Fig. 2 to three-phase faults in the vicinity of the balance-point of the relay. The equilateral triangle ABC is representative of the bus-voltage conditions at the relaying station, the line-to-neutral voltages being indicated at NA, NB and NC. Since the conditions existing during a three-phase fault are symmetrical, it does not make any difference in which phase the single compensator is connected, and hence the phase in which this compensator is connected may be denominated A. The line-current $I_A$ in this phase, during a three-phase fault on the protected power-line, will lag behind the line-to-neutral voltage NA by an angle which is the same as the impedance-angle of the line; and since the compensator which I use has the same impedance-angle as the line-impedance, the compensator-voltage $Aa'$ which is subtracted from the line-to-neutral bus-voltage NA lines in the same line as said line-to-neutral bus-voltage NA, opposing said bus-voltage.

If a three-phase fault should occur exactly at the balance-point of the relay, in Fig. 3, the magnitude of the compensator-voltage $Aa'$ will be exactly 1.5 times the magnitude of the line-to-neutral bus-voltage NA, which would bring the terminal $a'$ of the phase A compensated voltage down to the mid-point of the base BC of the bus-voltage triangle ABC. This means that the three voltages $xyz$ which are impressed upon the torque-element W in Fig. 2 are the three voltages $a'$ BC of Fig. 3, this being a collapsed triangle which has been reduced to a single straight line BC, so that the torque-element does not receive two out-of-phase voltages and hence the torque-element produces no torque and no response.

If the three-phase fault, in Fig. 3 had been located at a point which is closer than the balance-point, the phase A line-current $I_A$, or minus the sum of the two line-currents $(I_B+I_C)$, (there being no zero-sequence current $I_0$ when there is a three-phase fault), will be larger, in proportion to the line-to-neutral bus-voltage NA, than in the case when the fault was at the balance-point, and hence the compensator voltage-drop $Aa''$ will be larger, resulting in a negative-sequence compensated-voltage triangle $a''$CB, which will produce a relay-response. If the three-phase fault had been beyond the balance point, the resulting compensated-voltage triangle $a''$BC would have had the positive phase-sequence or succession of phases, and the relay would not respond.

Figure 4:
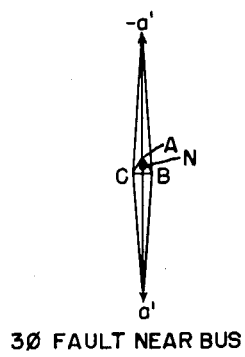

Fig. 4 is a vector-diagram depicting conditions which are obtained when the three-phase fault is at, or very close to, the relaying bus. If the fault is exactly at the bus, the bus-voltage will completely collapse to the neutral-point N, but if the fault is slightly removed from the bus, either in front of it or behind it, the bus-voltage triangle will be a small positive-sequence triangle such as ABC.

If the three-phase fault is exactly at the bus, in Fig. 4, the only voltage which will be applied to the torque-element will be the voltage-drop in the single compensator, which is connected in phase A, namely the voltage $Na'$, or $N(-a')$, depending upon whether the fault is immediately in front of the current transformer CT, in which case the line-current will be as shown at $AI_A$ in Fig. 3, or immediately behind the current transformer CT, resulting in a current such as $A(-I_A)$ which is shown in Fig. 3. Under these circumstances, the torque-element cannot develop any torque, and hence it cannot respond, except possibly momentarily on a memory-action in response to the collapsing BC voltage.

If the three-phase fault is sufficiently far in front of the bus to permit the magnitude of the delta bus-voltage BC to be large enough to be sensed by the very sensitive polyphase-responsive torque-element or relay, the relay will be impressed with a voltage-triangle $a'$CB which has a negative phase-sequence, so that the relay responds, but if such a fault is back of the bus, the relay will be impressed with a positive-sequence voltage-triangle $(-a')$ BC, and the relay cannot respond.

There is no zero-sequence current-component $I_0$ or voltage-component $V_0$ when there is a three-phase fault, because the line-voltage is collapsed completely to zero at the place where such a fault occurs, and hence only positive-sequence currents can flow. Hence, the subtraction of $3I_0$ from the line-current $I_A$, or the use of the equivalent quantity $-(I_B+I_C)$, makes no difference in the response of my three-phase relay to a three-phase fault, and this response is the same as the response in the previously mentioned Goldsborough application.

My object in extracting the neutral current $3I_0$ of the star-connected line-current transformers CT (Fig. 1) from the phase A line-current $I_A$ which energizes the single compensator, or in using the equivalent quantity $-(I_B+I_C)$, is to make this three-phase relay respond to close-in two-phase-to-ground faults which contain a high percentage of zero-sequence currents. This modification of the response-characteristic of the three-phase fault-responsive relay is sometimes needed to compensate for a shortcoming which is encountered in the operation of the illustrated phase-fault relays, such as $\phi\phi$–1, when applied to some extreme lines which have a very low zero-sequence source-impedance back of the relaying bus. In such a case, the zero-sequence impedance of the transmission network shorts the negative-sequence impedance, in the sequence-network connections, so that the phase-fault relay $\phi\phi$–1 does not receive a sufficient negative-sequence voltage-component to enable it to respond under the said conditions.

However, in my improved or modified single-compensator three-phase relay $3\phi$–1, the relay is made insensitive to the zero-sequence currents, which are now extracted from the line-current which energizes the compensator, and since the negative-sequence currents are already small, a close-in two-phase-to-ground fault looks, to my modified three-phase element, like a three-phase fault, so that my three-phase element responds. Therefore, the combined use of a phase-fault element, such as is shown and described at $\phi\phi$–1, and an improved or modified three-phase element, such as I have shown and described at $3\phi$–1, results in a combination which properly responds to all possible kinds of faults involving more than one line-phase; and a complete, perfectly operating, protective-system is produced.

In the foregoing forms of embodiment of a relaying assembly including my invention, I have shown and described certain mutual compensator-impedances which match the line-impedance of the protected power-line 11, to a predetermined point which is to correspond to the balance-point of the fault-responsive relay in question; or in some cases, I have defined the compensator-impedance as being the equivalent of a certain multiplier times the balance-point line-impedance $Z_{BP}$. The balance-point line-impedance $Z_{BP}$, to which I have been referring, includes the small resistance-component of the line-impedance, as well as the large reactive component thereof. This is shown by the provision of the resistance R1 (Fig. 1), which causes the phase-angle of the effective mutual compensator-impedance to match the phase-angle of the line-impedance of the particular power-line 11 which is being protected. The reason for this, is that I am using compensated bus-voltages. I am using a line-drop compensator or compensators to produce either the same proportionate voltage-drop as would be obtained in the line itself between the bus and the desired balance-point of the relay, or in other cases I have used a compensator voltage-drop which is related, in certain other defined ways, to the voltage-drop in the line-impedance between the bus and the aforesaid balance-point.

By causing the compensator-impedance to have the same phase-angle as the line-impedance, and by energizing the compensator with the same line-current which causes the impedance voltage-drop in the line, I achieve the result that the compensator voltage-drop will always lie along the line of the vector which represents the line-drop voltage from which the compensator-voltage is subtracted, or to which the compensator-voltage is added, depending upon the polarity of the compensator-connections. While theoretically, some sort of possibly tolerable accuracy of response might be obtained by ignoring the resistance parts of the line-impedances, the generator-impedances, and the like (as has been done with previous types of distance-responsive relays which did not use compensated voltages in the manner which I am doing, in responding to faults), I believe that the additional accuracy of operation which is obtainable by matching the phase-angle as well as the magnitude or magnitude-ratio of the line-impedance to the balance-point, is sufficiently important to more than warrant the slight additional complication which is involved by the use of the resistor R1 or its equivalent.

In the preceding description of the fault-responsive units, such as the phase-to-phase unit $\phi\phi$–1 in Fig. 1, I have stated that the effective impedance of certain compensators is equal to the line-impedance to a fault at the desired balance point. This statement really presupposes that the line has a single impedance, which is the same in all three of the line-conductors A, B and C, which is true of a well-constructed balanced transmission-line in which there is adequate transposition of the phase-wires. In the case of a non-transposed transmission-line, the reactance parts of the impedances of the three line-wires will not all be the same, and it must be understood, in such a case, that each such compensator could be set to match the impedance of its own line-wire. I wish my description to be read with this explanation in mind.

In the preceding description of the coincidence of the phase-angle of the compensator voltage-drop with the phase-angle of the voltage to which the compensator voltage-drop is being added or subtracted, have really been assuming the general case in which the impedance of the fault itself is negligibly small, so that the voltage between the faulted phases is zero at the fault.

While I have illustrated my invention in two different forms of embodiment, and while I have explained the general principles of its design and operation in the best form and manner at present visualized, I wish it to be understood that the foregoing illustration, description and explanations are only by way of example, and were not intended as limitations, in the sense that it is possible to substitute various equivalents, or to add certain additional refinements, or to omit certain of the illustrated refinements which may not be needed in any particular case, without departing from the essential spirit of my invention.

I claim as my invention:

1. A compensated-voltage three-phase fault-responsive relaying unit for responding to three-phase faults on a three-phase transmission-line, said unit including: a means, energized from the line-voltage at the relaying station, for producing a set of derived polyphase voltages having a phase-sequence corresponding to the line-voltages; a compensator, connected in series-circuit relation to one phase of said derived polyphase voltages, for producing a set of compensated polyphase voltages; a means for energizing said compensator proportionately to the line-current in the corresponding line-wire of the transmission-line, minus substantially three times the zero-sequence line-current component; said compensator having a mutual impedance equivalent to 1.5 times the line-impedance to a predetermined fault-location, whereby the compensated polyphase voltages collapse to a single phase upon the occurrence of a three-phase fault at said predetermined fault-location, and also upon the occurrence of a three-phase fault at the relaying station, whereby the compensated polyphase voltages have a negative sequence of phases upon the occurrence of a three-phase fault between the relaying station and said predetermined fault-location, and whereby the compensated polyphase voltages have a positive sequence of phases upon the occurrence of a three-phase fault at any other location; and a polyphase-responsive relaying element, energized from the compensated polyphase voltages, for controlling an electrical circuit when the compensated polyphase voltages have a negative sequence of phases.

2. A compensated-voltage three-phase fault-responsive relaying unit for responding to three-phase faults on a three-phase transmission-line, said unit including: a means, energized from the line-voltage at the relaying station, for producing a set of derived polyphase voltages having a phase-sequence corresponding to the line-voltages; a compensator, connected in series-circuit relation to one phase of said derived polyphase voltages for producing a set of compensated polyphase voltages; a means for energizing said compensator proportionately to the line-current in the corresponding line-wire of the transmission-line, minus a substantial amount of the zero-sequence line-current component; said compensator having a mutual impedance of equivalent to 1.5 times the line-impedance to a predetermined fault-location, whereby the compensated polyphase voltages collapse to a single phase upon the occurrence of a three-phase fault at said predetermined fault-location, and also upon the occurrence of a three-phase fault at the relaying station, whereby the compensated polyphase voltages have a negative sequence of phases upon the occurrence of a three-phase fault between the relaying station and said predetermined fault-location, and whereby the compensated polyphase voltages have a positive sequence of phases upon the occurrence of a three-phase fault at any other location; and a polyphase-responsive relaying element, energized from the compensated polyphase voltages, for controlling an electrical circuit when the compensated polyphase voltages have a negative sequence of phases.

3. A compensated-voltage three-phase fault-responsive relaying unit for responding to three-phase faults on a three-phase transmission-line, said unit including: a means, energized from the line-voltage at the relaying station, for producing a set of derived polyphase voltages having a phase-sequence corresponding to the line-voltages; a compensator, connected in series-circuit relation to one phase of said derived polyphase voltages for producing a set of compensated polyphase voltages; a means for energizing said compensator proportionately to the sum of the line-currents in the two line-wires of the transmission-line, other than the line-wire corresponding to the compensator-containing phase, said compensator having a mutual impedance equivalent to 1.5 times the line-impedance to a predetermined fault-location, whereby the compensated polyphase voltages collapse to a single phase upon the occurrence of a three-phase fault at said predetermined fault-location, and also upon the occurrence of a three-phase fault at the relaying station, whereby the compensated polyphase voltages have a negative sequence of phases upon the occurrence of a three-phase fault between the relaying station and said predetermined fault-location, and whereby the compensated polyphase voltages have a positive sequence of phases upon the occurrence of a three-phase fault at any other location; and a polyphase-responsive relaying element, energized from the compensated polyphase voltages, for controlling an electrical circuit when the compensated polyphase voltages have a negative sequence of phases.

4. A compensated-voltage three-phase fault-responsive relaying unit for responding to three-phase faults on a three-phase transmission-line, said unit including: a means, energized from the line-voltage at the relaying station, for producing a set of derived polyphase voltages having a phase-sequence corresponding to the line-voltages; a compensator, connected in series-circuit relation to one phase of said derived polyphase voltages for producing a set of compensated polyphase voltages; a means of energizing said compensator proportionately to the line-current in the corresponding line-wire of the transmission-line, minus substantially three times the zero-sequence line-current component; said compensator having a mutual impedance equivalent to 1.5 times the line-impedance to a predetermined fault-location, whereby the compensated polyphase voltages collapse to a single phase upon the occurrence of a three-phase fault at said predetermined fault-location, and also upon the occurrence of a three-phase fault at the relaying station, whereby the compensated polyphase voltages have a negative sequence of phases upon the occurrence of a three-phase fault between the relaying station and said predetermined fault-location, and whereby the compensated polyphase voltages have a positive sequence of phases upon the occurrence of a three-phase fault at any other location; and a two-circuit polyphase-responsive relaying element, energized from two delta phases of said compensated voltages, for controlling an electrical circuit when the compensated polyphase voltages have a negative sequence of phases.

5. A compensated-voltage three-phase fault-responsive relaying unit for responding to three-phase faults on a three-phase transmission-line, said unit including: a means, energized from the line-voltage at the relaying station, for producing a set of derived polyphase voltages having a phase-sequence corresponding to the line-voltages; a compensator, connected in series-circuit relation to one phase of said derived polyphase voltages for producing a set of compensated polyphase voltages; a means of energizing said compensator proportionately to the line-current in the corresponding line-wire of the transmission-line, minus a substantial amount of the zero-sequence line-current component; said compensator having a mutual impedance equivalent to 1.5 times the line-impedance to a predetermined fault-location, whereby the compensated polyphase voltages collapse to a single phase upon the occurrence of a three-phase fault at said predetermined fault-location, and also upon the occurrence of a three-phase fault at the relaying station, whereby the compensated polyphase voltages have a negative sequence of phases upon the occurrence of a three-phase fault between the relaying station and said predetermined fault location, and whereby the compensated polyphase voltages have a positive sequence of phases upon the occurrence of a three-phase fault at any other location; and a two-circuit polyphase-responsive relaying element, energized from two delta phases of said compensated voltages, for controlling an electrical circuit when the compensated polyphase voltages have a negative sequence of phases.

6. A compensated-voltage three-phase fault-responsive relaying unit for responding to three-phase faults on a three-phase transmission-line, said unit including: a means, energized from the line-voltage at the relaying station, for producing a set of derived polyphase voltages having a phase-sequence corresponding to the line-voltages; a compensator, connected in series-circuit relation to one phase of said derived polyphase voltages for producing a set of compensated polyphase voltages; a means for energizing said compensator proportionately to the sum of the line-currents in the two line-wires of the transmission-line, other than the line-wire corresponding to the compensator-containing phase, said compensator having a mutual impedance equivalent to 1.5 times the line-impedance to a predetermined fault-location, whereby the compensated polyphase voltages collapse to a single phase upon the occurrence of a three-phase fault at said predetermined fault-location, and also upon the occurrence of a three-phase fault at the relaying station, whereby the compensated polyphase voltages have a negative sequence of phases upon the occurrence of a three-phase fault between the relaying station and said predetermined fault-location, and whereby the compensated polyphase voltages have a positive sequence of phases upon the occurrence of a three-phase fault at any other location; and a two-circuit polyphase-responsive relaying element, energized from two delta phases of said compensated voltages, for controlling an electrical circuit when the compensated polyphase voltages have a negative sequence of phases.

7. A compensated-voltage three-phase fault-responsive relaying unit for responding to three-phase faults on a three-phase transmission-line, said unit including: a means, energized from the line-voltage at the relaying station, for producing a set of derived polyphase voltages having a phase-sequence corresponding to the line-voltages; a compensator, connected in series-circuit relation to one phase of said derived polyphase voltages for producing a set of compensated polyphase voltages; a means for energizing said compensator proportionately to the line-current in the corresponding line-wire of the transmission-line, minus substantially three times the zero-sequence line-current component; said compensator having a mutual impedance equivalent to 1.5 times the line-impedance to a predetermined fault-location, whereby the compensated polyphase voltages collapse to a single phase upon the occurrence of a three-phase fault at said predetermined fault-location, and also upon the occurrence of a three-phase fault at the relaying station, whereby the compensated polyphase voltages have a negative sequence of phases upon the occurrence of a three-phase fault between the relaying station and said predetermined fault-location, and whereby the compensated polyphase voltages have a positive sequence of phases upon the occurrence of a three-phase fault at any other location; and a two-circuit polyphase-responsive relaying element, energized respectively from a compensated-voltage phase which contains said compensator and from a compensated-voltage phase which does not contain said compensator, for controlling an electrical circuit when the compensated polyphase voltages have a negative sequence of phases.

8. A compensated-voltage three-phase fault-responsive relaying unit for responding to three-phase faults on a three-phase transmission-line, said unit including: a means, energized from the line-voltage at the relaying station, for producing a set of derived polyphase voltages having a phase-sequence corresponding to the line-voltages; a compensator, connected in series-circuit relation to one phase of said derived polyphase voltages for producing a set of compensated polyphase voltages; a means for energizing said compensator proportionately to the line-current in the corresponding line-wire of the transmission-line, minus a substantial amount of the zero-sequence line-current component; said compensator having a mutual impedance equivalent to 1.5 times the line-impedance to a predetermined fault-location, whereby the compensated polyphase voltages collapse to a single phase upon the occurrence of a three-phase fault at said predetermined fault-location, and also upon the occurrence of a three-phase fault at the relaying station, whereby the compensated polyphase voltages have a negative sequence of phases upon the occurrence of a three-phase fault between the relaying station and said predetermined fault-location, and whereby the compensated polyphase voltages have a positive sequence of phases upon the occurrence of a three-phase fault at any other location; and a two-circuit polyphase-responsive relaying element, energized respectively from a compensated-voltage phase which contains said compensator and from a compensated-voltage phase which does not contain said compensator, for controlling an electrical circuit when the compensated polyphase voltages have a negative sequence of phases.

9. A compensated-voltage three-phase fault-responsive relaying unit for responding to three-phase faults on a three-phase transmission-line, said unit including: a means, energized from the line-voltage at the relaying station, for producing a set of derived polyphase voltages having a phase-sequence corresponding to the line-voltages; a compensator, connected in series-circuit relation to one phase of said derived polyphase voltages for producing a set of compensated polyphase voltages; a means for energizing said compensator proportionately to the sum of the line-currents in the two line-wires of the transmission-line, other than the line-wire corresponding to the compensator-containing phase, said compensator having a mutual impedance equivalent to 1.5 times the line-impedance to a predetermined fault-location, whereby the compensated polyphase voltages collapse to a single phase upon the occurrence of a three-phase fault at said predetermined fault-location, and also upon the occurrence of a three-phase fault at the relaying station, whereby the compensated polyphase voltages have a negative sequence of phases upon the occurrence of a three-phase fault between the relaying station and said predetermined fault-location, and whereby the compensated polyphase voltages have a positive sequence of phases upon the occurrence of a three-phase fault at any other location; and a two-circuit polyphase-responsive relaying element, energized respectively from a compensated-voltage phase which contains said compensator and from a compensated-voltage phase which does not contain said compensator for controlling an electrical circuit when the compensated polyphase voltages have a negative sequence of phases.

10. A protective-relaying combination, for protecting a three-phase transmission-line against all faults, involving more than one line-phase, which occur on the transmission-line between the relaying station and a predetermined fault-location on the line; said combination including a compensated-voltage three-phase fault-responsive relaying unit, a compensated-voltage phase-fault relaying unit, and a relay-controlled circuit-means for performing a fault-protective function for the transmission-line, in response to a response of either of said units; said units including a means, energized from the line-voltage at the relaying station, for producing a set of derived polyphase voltages having a phase-sequence corresponding to the line-voltages; said three-phase relaying unit further including: a compensator, connected in series-circuit relation to one phase of said derived polyphase voltages for producing a set of compensated polyphase voltages; a means for energizing said compensator proportionately to the line-current in the corresponding line-wire of the transmission-line, minus substantially three times the zero-sequence line-current component; said compensator having a mutual impedance equivalent to 1.5 times the line-impedance to a predetermined fault-location, whereby the compensated polyphase voltages collapse to a single phase upon the occurrence of a three-phase fault at said predetermined fault-location, and also upon the occurrence of a three-phase fault at the relaying station, whereby the compensated polpyhase voltages have a negative sequence of phases upon the occurrence of a three-phase fault between the relaying station and said predetermined fault-location, and whereby the compensated polyphase voltages have a positive sequence of phases upon the occurrence of a three-phase fault at any other location; and a polyphase-responsive relaying element, energized from the compensated polyphase voltages of the three-phase unit, for controlling an electrical circuit when said compensated polyphase voltages have a negative sequence of phases; and said phase-fault relaying unit further including; a set of three line-drop compensators, connected in series-circuit relation to the respective phases of said derived polyphase voltages, and energized proportionately to the respective line-currents in the corresponding line-wires of the transmission-line; each of said three line-drop compensators having an impedance equivalent to the line-impedance to a predetermined fault-location, whereby the compensated polyphase voltages collapse to a single phase upon the occurrence of a line-to-line fault across any pair of line-phases of said predetermined fault-location, whereby the compensated polyphase voltages have a negative sequence of phases upon the occurrence of a line-to-line fault across any pair of line-phases between the relaying station and said predetermined fault-location, and whereby the compensated polyphase voltages have a positive sequence of phases upon the occurrence of a line-to-line fault across any pair of line-phases at any other fault-locations; and a polyphase-responsive relaying element, energized from the compensated polyphase voltages of the phase-fault unit, for controlling an electrical circuit when said compensated polyphase voltages have a negative sequence of phases.

11. A protective-relaying combination, for protecting a three-phase transmission-line against all faults, involving more than one line-phase, which occur on the transmission-line between the relaying station and a predetermined fault-location on the line; said combination including a compensated-voltage three-phase fault-responsive relaying unit, a compensated-voltage phase-fault relaying unit, and a relay-controlled circuit-means for performing a fault-protective function for the transmission-line, in response to a response of either of said units, said units including a means, energized from the line-voltage at the relaying station, for producing a set of derived polyphase voltages having a phase-sequence corresponding to the line-voltages; said three-phase relaying unit further including: a compensator, connected in series-circuit relation to one phase of said derived polyphase voltages for producing a set of compensated polyphase voltages; a means for energizing said compensator proportionately to the line-current in the corresponding line-wire of the transmission-line, minus a substantial amount of the zero-sequence line-current component; said compensator having a mutual impedance equivalent to 1.5 times the line-impedance to a predetermined fault-location, whereby the compensated polyphase voltages collapse to a single phase upon the occurrence of a three-phase fault at said predetermined fault-location, and also upon the occurrence of a three-phase fault at the relaying station, whereby the compensated polyphase voltages have a negative sequence of phases upon the occurrences of a three-phase fault between the relaying station and said predetermined fault-location, and whereby the compensated polyphase voltages have a positive sequence of phases upon the occurrence of a three-phase fault at any other location; and a polyphase responsive relaying element, energized from the compensated polyphase voltages of the three-phase unit, for controlling an electrical circuit when said compensated polyphase voltages have a negative sequence of phases; and said phase-fault relaying unit further including: a set of three line-drop compensators, connected in series-circuit relation to the respective phases of said derived polyphase voltages, and energized proportionately to the respective line-currents in the corresponding line-wires of the transmission-line; each of said three line-drop compensators having an impedance equivalent to the line-impedance to a predetermined fault-location, whereby the compensated polyphase voltages collapse to a single phase upon the occurrence of a line-to-line fault across any pair of line-phases at said predetermined fault-location, whereby the compensated polyphase voltages have a negative sequence of phases upon the occurrence of a line-to-line fault across any pair of line-phases between the relaying station and said predetermined fault-location, and whereby the compensated polyphase voltages have a positive sequence of phases upon the occurrence of a line-to-line fault across any pair of line-phases at any other fault-location; and a polyphase-responsive relaying element, energized from the compensated polyphase voltages of the phase-fault unit, for controlling an electrical circuit when said compensated polyphase voltages have a negative sequence of phases.

12. A protective-relaying combination, for protecting a three-phase transmission-line against all faults, involving more than one line-phase, which occur on the transmission-line between the relaying station and a predetermined fault-location on the line; said combination including a compensated-voltage three-phase fault-responsive relaying unit, a compensated-voltage phase-fault relaying unit, and a relay-controlled circuit-means for performing a fault-protective function for the transmission-line, in response to a response of either of said units, said units including a means, energized from the line-voltage at the relaying station, for producing a set of derived polyphase voltages having a phase-sequence corresponding to the line-voltages; said three-phase relaying unit further including: a compensator, connected in series-circuit relation to one phase of said derived polyphase voltages for producing a set of compensated polyphase voltages; a means for energizing said compensator proportionately to the sum of the line-currents in the two line-wires of the transmission-line, other than the line-wire corresponding to the compensator-containing phase, said compensator having a mutual impedance equivalent to 1.5 times the line-impedance to a predetermined fault-location, whereby the compensated polyphase voltages collapse to a single phase upon the occurrence of a three-phase fault at said predetermined fault-location, and also upon the occurrence of a three-phase fault at the relaying station, whereby the compensated polyphase voltages have a negative sequence of phases upon the occurrence of a three-phase fault between the relaying station and said predetermined fault-location, and whereby the compensated polyphase voltages have a positive sequence of phases upon the occurrence of a three-phase fault at any other location; and a polyphase-response relaying element, energized from the compensated polyphase voltages of the three-phase unit, for controlling an electrical circuit when said compensated polyphase voltages have a negative sequence of phases; and said phase-fault relaying unit further including: a set of three line-drop compensators, connected in series-circuit relation to the respective phases of said derived polyphase voltages, and energized proportionately to the respective line-currents in the corresponding line-wires of the transmission-line; each of said three line-drop compensators having an impedance equivalent to the line-impedance to a predetermined fault-location, whereby the compensated polyphase voltages collapse to a single phase upon the occurrence of a line-to-line fault across any pair of line-phases at said predetermined fault-location, whereby the compensated polyphase voltages have a negative sequence of phases upon the occurrence of a line-to-line fault across any pair of line-phases between the relaying station and said predetermined fault-location, and whereby the compensated polyphase voltages have a positive sequence of phases upon the occurrence of a line-to-line fault across any pair of line-phases at any other fault-location; and a polyphase-responsive relaying element, energized from the compensated polyphase voltages of the phase-fault unit, for controlling an electrical circuit when said compensated polyphase voltages have a negative sequence of phases.

13. In a relaying assembly for a three-phase transmission system having line conductors A, B, and C, a phase-sequence-responsive translating device having a plurality of first input terminals suitable for energization by a polyphase voltage, said device being responsive to the difference between the positive-phase-sequence component and the negative-phase-sequence component of a polyphase voltage applied to the first input terminals for operation from a first circuit-control condition to a second circuit-control condition, an impedance unit having a terminal connected to one of the first input terminals corresponding to the line conductor A and having a second terminal, means for applying to the second terminal and to the first input terminals other than the last-named first input terminal voltages corresponding respectively to the voltages of the line conductors A, B and C, and input means effective when energized for directing a current corresponding to the current in the line conductor A minus a substantial zero-sequence line-current component through at least part of the last-named impedance unit which does not pass through the translating device.

14. In a relaying assembly for a three-phase transmission system having line conductors A, B and C, a phase-sequence-responsive translating device having a plurality of first input terminals suitable for energization by a polyphase voltage, said device being responsive to the difference between the positive-phase-sequence component and the negative-phase-sequence component of a polyphase voltage applied to the terminals for operation from a first circuit-control condition to a second circuit-control condition, a plurality of impedance units each having an impedance angle adjustable in the range of impedance angle of a line of said transmission system in a zone normally protected by distance relays, each of said impedance units having a terminal connected to a separate one of the first input terminals and having a second terminal, a plurality of input means each effective when energized for directing a current proportional to a separate one of the currents in said line conductors through at least part of a separate one of the impedance units which does not pass through the translating device, whereby the translating device is energized by a polyphase voltage dependent on the resultant of the polyphase voltage applied to the second terminals and the voltage across the impedances, means for energizing said second terminals in accordance with the voltages of said line conductors, a second phase-sequence-responsive translating device having a plurality of third input terminals suitable for energization by a polyphase voltage, said last-named device being responsive to the difference between the positive-phase-sequence component and the negative-phase-sequence component of a polyphase voltage applied to the third input terminals for operation from a first circuit-control condition to a second circuit-control condition, an adjustable impedance unit having a terminal connected to one of the third input terminals corresponding to the line conductor A and having a fourth terminal, means for applying to the fourth terminal and to the third input terminals other than the last-named third input terminal voltages corresponding respectively to the voltages of the line conductors A, B and C, and input means effective when energized for directing a current corresponding to the current in the line conductor A minus a substantial zero-sequence line-current component through at least part of the last-named impedance unit which does not pass through the second translating device.

15. In a relaying assembly for a three-phase transmission system having line conductors A, B and C, a phase-sequence-responsive translating device having a plurality of first input terminals suitable for energization by a polyphase voltage, said device being responsive to the difference between the positive-phase-sequence component and the negative-phase-sequence component of a polyphase voltage applied to the terminals for operation from a first circuit-control condition to a second circuit-control condition, a plurality of impedance units each having an impedance angle adjustable in the range of impedance angle of a line of said transmission system in a zone normally protected by distance relays, each of said impedance units having a terminal connected to a separate one of the first input terminals and having a second terminal, a plurality of input means each effective when energized for directing a current proportional to a separate one of the currents in said line conductors through at least part of a separate one of the impedance units which does not pass through the translating device, whereby the translating device is energized by a polyphase voltage dependent on the resultant of the polyphase voltage applied to the second terminals and the voltage across the impedances, means for energizing said second terminals in accordance with the voltages of said line conductors, a second phase-sequence-responsive translating device having a plurality of third input terminals suitable for energization by a polyphase voltage, said last-named device being responsive to the difference between the positive-phase-sequence component and the negative-phase-sequence component of a polyphase voltage applied to the third input terminals for operation from a first circuit-control condition to a second circuit-control condition, an adjustable impedance unit having a terminal connected to one of the third input terminals corresponding to the line conductor A and having a fourth terminal, means for applying to the fourth terminal and to the third input terminals other than the last-named third input terminal voltages corresponding respectively to the voltages of the line conductors A, B and C, and input means effective when energized for directing a current corresponding to the current in the line conductor A minus a substantial zero-sequence line-current component through at least part of the last-named impedance unit which does not pass through the second translating device, the impedance value of the last-named impedance unit being substantially larger than the impedance values of said plurality of impedance units.

16. In a relaying assembly for protecting a zone of a polyphase transmission line having line conductors A, B and C, a first phase-sequence-responsive translating device, said device being responsive to the difference between the positive-phase-sequence component and the negative-phase-sequence component of a polyphase voltage applied to the terminals for operation from a first circuit-control condition to a second circuit-control condition, a plurality of impedance units each having an impedance angle adjustable in the range of impedance angle of a line of the polyphase transmission system in a zone normally protected by distance relays, each of said impedance units having a terminal connected to a separate one of the first input terminals and having a second terminal, said second terminals being connected for energization in accordance with a set of polyphase voltages derived from said line voltages, a plurality of input means each effective when energized for directing a separate current from a set of polyphase currents derived from the currents of said line through at least part of an appropriate separate one of the impedance units which does not pass through the translating device, said impedance units being symmetrically disposed between the second terminals and the first input terminals, whereby the translating device is energized by a set of polyphase voltages dependent on the resultant of the set of polyphase voltages applied to the second terminals and the voltages across the impedances, a second phase-sequence-responsive translating device having a plurality of third input terminals suitable for energization by a polyphase voltage, said last-named device being responsive to the difference between the positive-phase-sequence component and the negative-phase-sequence component of a polyphase voltage applied to the third input terminals for operation from a first circuit-control condition to a second circuit-control condition, a plurality of fourth terminals connected for energization in accordance with a set of polyphase voltages derived from said line, an impedance unit connected between one each of the third and fourth terminals associated with the line conductor A to present an asymmetric polyphase impedance therebetween, and input means effective when energized for directing a current corresponding to the sum of the currents in the line conductors B and C through at least part of the last-named impedance unit which does not pass through the second translating device, said first translating device responding to phase-to-phase faults of the zone of said line and the second translating device responding to balanced faults in said zone.

References Cited in the file of this patent

UNITED STATES PATENTS

| | | |
|---|---|---|
| 1,615,691 | Fortescue et al. | Jan. 25, 1927 |
| 1,963,193 | Evans | June 19, 1934 |
| 2,221,602 | Parsons | Nov. 12, 1940 |
| 2,295,398 | Griscom | Sept. 8, 1942 |
| 2,408,208 | Goldsborough | Sept. 24, 1946 |
| 2,426,062 | Sonneman | Aug. 19, 1947 |
| 2,445,429 | Goldsborough | July 20, 1948 |
| 2,479,345 | Goldsborough | Aug. 16, 1949 |